(No Model.)
O. DE PEZZER.
CATHETER.
No. 504,744. Patented Sept. 12, 1893.
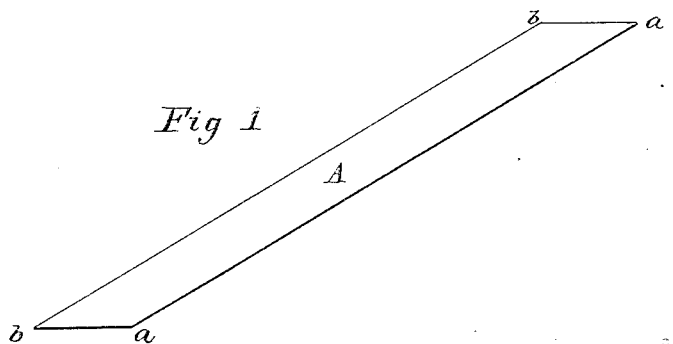
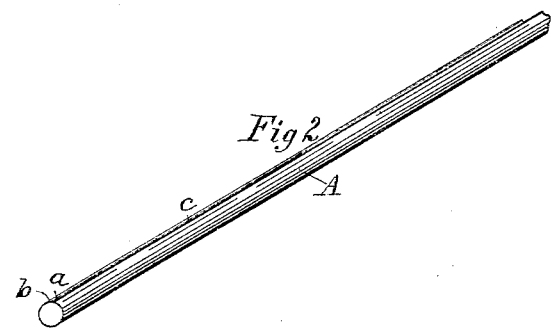
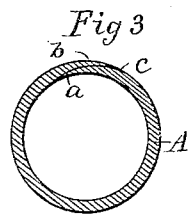
WITNESSES:
R. B. Shepherd.
L. M. Wachtschlager.
INVENTOR
Oscar de Pezzer,
BY Briesen & Knauth
his ATTORNEYS:

UNITED STATES PATENT OFFICE.

OSCAR DE PEZZER, OF PARIS, FRANCE.

CATHETER.

SPECIFICATION forming part of Letters Patent No. 504,744, dated September 12, 1893.

Application filed April 6, 1893. Serial No. 413,127. (No model.) Patented in France February 20, 1891, No. 211,570; in Belgium March 3, 1891, No. 93,994, and in England March 3, 1891, No. 3,774.

*To all whom it may concern:*

Be it known that I, OSCAR DE PEZZER, of the city of Paris, France, have invented Improvements in Catheters and the Like, (for which I have obtained patents in the following countries: France, February 20, 1891, No. 211,570; Belgium, March 3, 1891, No. 93,994, and England, March 3, 1891, No. 3,774,) of which the following is a full, clear, and exact description.

My invention relates to improvements in flexible catheters and the like.

Nelatoric flexible india-rubber catheters have hitherto been made by molding, for which purpose it is necessary to mix the india-rubber with certain substances. Moreover, the bore of these flexible catheters is very small compared with their external diameter so that liquid can only be drawn off slowly from the bladder and the bore is often imperfectly formed and not truly central.

My invention has for its object to produce a highly-flexible catheter having none of the objections above mentioned.

In the drawings, in which like letters of reference indicate corresponding parts, Figure 1 represents a thin sheet of pure rubber from which the catheter is made. Fig. 2 is a view of my improved catheter tube formed by rolling the thin sheet of rubber and cementing the edges, and Fig. 3 is an enlarged cross section of Fig. 2 showing more clearly the cementing seam.

According to my invention I make a catheter by rolling upon itself a thin sheet or strip A of pure rubber, such as that known in india-rubber manufacture by the name of sheet rubber (feuille Anglaise or mackintosh) and uniting the edges $a\ b$, so as to form a tube, by any suitable cementing process, forming a seam $c$. One or both of these edges may be thinned as shown. The cementing material is capable of withstanding the heat of boiling water. In this manner a tube of pure rubber is obtained, which can be easily inserted, notwithstanding its great flexibility, having very thin walls and a bore of large diameter capable of passing a relatively large quantity of liquid in a very short space of time, and perfectly uniform throughout. The instrument being made of pure rubber is capable of being sterilized in the same manner as catheters now in use, by exposure to heat or washing in boiling water or other disinfecting liquids susceptible of rendering it completely aseptic. Such catheters may be made of any size and of cylindrical or conical form.

Having described my invention, I claim—

As a new article of manufacture, a catheter made of a sheet of pure india-rubber, rolled into required shape, and having its edges thinned and cemented together, substantially as and for the purpose specified.

The foregoing specification of my improvements in catheters and the like signed by me this 18th day of March, 1891.

OSCAR DE PEZZER.

Witnesses:
ROBT. M. HOOPER,
ALBERT MOREAU.